(12) United States Patent
Ernst et al.

(10) Patent No.: US 9,902,024 B2
(45) Date of Patent: Feb. 27, 2018

(54) METHOD AND DEVICE FOR REPAIRING AN AIRCRAFT AND/OR GAS TURBINE COMPONENT

(71) Applicant: LUFTHANSA TECHNIK AG, Hamburg (DE)

(72) Inventors: Michael Ernst, Pinneberg (DE); Thiemo Ullrich, Heidgraben (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 172 days.

(21) Appl. No.: 14/648,121

(22) PCT Filed: Nov. 25, 2013

(86) PCT No.: PCT/EP2013/074553
§ 371 (c)(1),
(2) Date: May 28, 2015

(87) PCT Pub. No.: WO2014/082947
PCT Pub. Date: Jun. 5, 2014

(65) Prior Publication Data
US 2015/0283654 A1 Oct. 8, 2015

(30) Foreign Application Priority Data
Nov. 28, 2012 (DE) .................. 10 2012 221 782

(51) Int. Cl.
*B23P 6/00* (2006.01)
*G05B 19/4097* (2006.01)
(Continued)

(52) U.S. Cl.
CPC .............. *B23P 6/007* (2013.01); *B23P 6/002* (2013.01); *B64F 5/40* (2017.01); *G05B 19/4097* (2013.01);
(Continued)

(58) Field of Classification Search
CPC .................. B64F 5/40; G05B 19/4097; G05B 2219/50214; Y10T 29/49618;
(Continued)

(56) References Cited

U.S. PATENT DOCUMENTS 4,965,665 A * 10/1990 Amir .................. G01B 11/2518
348/131
4,995,087 A * 2/1991 Rathi ................... B23K 26/032
382/152
(Continued)

FOREIGN PATENT DOCUMENTS

DE 89 09 840 7/1991
DE 694 13 402 5/1999
(Continued)

OTHER PUBLICATIONS

Gao, J., et al., "An integrated adaptive repair solution for complex aerospace components through geometry reconstruction," *International Journal of Advanced Manufacturing Technology*, 2008, vol. 36, pp. 1170-1179.
(Continued)

*Primary Examiner* — Jason L Vaughan
(74) *Attorney, Agent, or Firm* — Saliwanchik, Lloyd & Eisenschenk

(57) ABSTRACT

The invention relates to a method for repairing an aircraft or gas turbine component, wherein the method comprises the following automated steps: a) checking the component for cracks by means of an optical measurement method, wherein determined geometry and/or damage data are stored with reference to the component, b) generating an adaptive processing strategy on the basis of the determined geometry and/or damage data in a data processing unit, c) machining the component, d) determining the changed geometry data of the component, e) performing repair welding, f) checking
(Continued)

Figure 1:
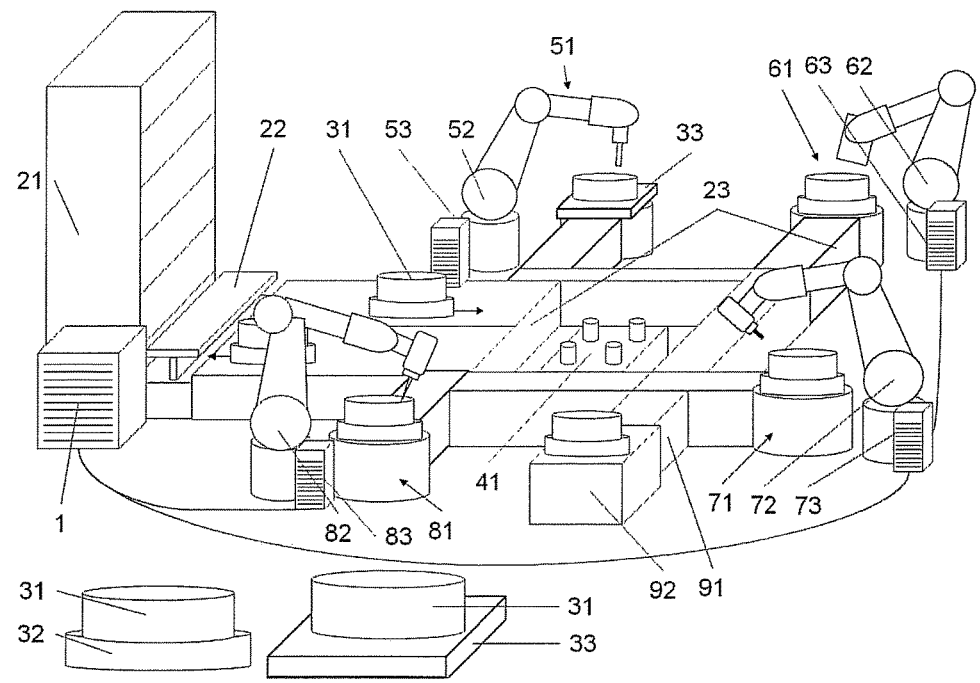

the component for cracks by means of an optical measurement method.

20 Claims, 1 Drawing Sheet

(51) Int. Cl.
  *B64F 5/40* (2017.01)
  *F01D 5/00* (2006.01)
(52) U.S. Cl.
  CPC .......... *B23P 2700/13* (2013.01); *F01D 5/005* (2013.01); *F05D 2230/80* (2013.01); *F05D 2270/804* (2013.01); *G05B 2219/50214* (2013.01); *Y10T 29/49318* (2015.01); *Y10T 29/49618* (2015.01); *Y10T 29/5176* (2015.01)
(58) Field of Classification Search
  CPC .......... Y10T 29/49318; Y10T 29/5176; B23P 2700/13; B23P 6/002; B23P 6/005; B23P 6/007; F01D 5/005
  USPC ................................................. 702/33, 34, 35
  See application file for complete search history.

(56) References Cited

U.S. PATENT DOCUMENTS

| | | | | |
|---|---|---|---|---|
| 4,998,005 A * | 3/1991 | Rathi | .................... | B23K 26/032 219/121.62 |
| 5,398,113 A * | 3/1995 | de Groot | ............ | G01B 11/2441 356/497 |
| 5,400,491 A | 3/1995 | Yaworsky et al. | | |
| 5,680,215 A * | 10/1997 | Huber | .................. | G01B 11/306 356/237.1 |
| 6,311,100 B1 * | 10/2001 | Sarma | ................ | G05B 19/4097 700/186 |
| 6,376,801 B1 | 4/2002 | Farrell et al. | | |
| 7,397,550 B2 * | 7/2008 | Hackney | ............ | G01B 11/2513 257/E21.001 |
| 7,865,316 B2 * | 1/2011 | Turner | ............... | G01N 29/0654 356/432 |
| 8,247,733 B2 | 8/2012 | Zhu | | |
| 8,521,480 B2 * | 8/2013 | Kesler | .................... | G06Q 10/04 382/141 |
| 8,831,895 B2 * | 9/2014 | Hedl | .................... | G01N 29/043 702/34 |
| 8,910,361 B2 | 12/2014 | Rickenbacher et al. | | |
| 2002/0128790 A1 | 9/2002 | Woodmansee | | |
| 2003/0167616 A1 | 9/2003 | Harding et al. | | |
| 2008/0147347 A1 * | 6/2008 | Shaw | .................... | G01B 11/162 702/108 |
| 2009/0304515 A1 | 12/2009 | Hanrieder et al. | | |
| 2012/0297600 A1 | 11/2012 | Ullrich et al. | | |
| 2013/0060369 A1 * | 3/2013 | Simard | .............. | G05B 19/4083 700/98 |
| 2013/0163848 A1 * | 6/2013 | Ulbricht | .................. | G06T 7/001 382/141 |

FOREIGN PATENT DOCUMENTS

| | | |
|---|---|---|
| DE | 101 25 307 | 8/2002 |
| DE | 10 2006 012 675 | 9/2007 |
| DE | 601 27 789 | 12/2007 |
| DE | 10 2011 103 003 | 11/2012 |
| EP | 0 350 000 | 1/1990 |
| EP | 1 422 380 | 5/2004 |
| EP | 1 649 970 | 4/2006 |
| EP | 2 206 575 | 7/2010 |
| EP | 2 286 956 | 2/2011 |
| EP | 2 484 481 | 8/2012 |
| FR | 2 897 550 | 8/2007 |
| WO | WO-2009/105221 | 8/2009 |

OTHER PUBLICATIONS

Gao, J., et al., "Investigation of a 3D non-contact measurement based blade repair integration system," *Aircraft Engineering and Aerospace Technology*, 2005, vol. 77, No. 1, pp. 34-41.

Zheng, J., et al., "Worn area modeling for automating the repair of turbine blades," *International Journal of Advanced Manufacturing Technology*, 2006, vol. 29, pp. 1062-1067.

Examination Report dated Oct. 10, 2017 in European Patent Application No. 13 799 246.7, pp. 1-8.

* cited by examiner

METHOD AND DEVICE FOR REPAIRING AN AIRCRAFT AND/OR GAS TURBINE COMPONENT

CROSS-REFERENCE TO RELATED APPLICATIONS

The present application is the U.S. National Stage Application of International Patent Application No. PCT/EP2013/074553, filed on Nov. 25, 2013, which claims priority to German Patent Application No. 10 2012 221 782.7, filed on Nov. 28, 2012, both of which are hereby incorporated by reference herein in their entirety, including any figures, tables, or drawings.

The invention relates to a method and to a corresponding device for repairing an aircraft and/or gas turbine component.

Aircraft components are subjected to high stress during operation. In addition to components made of composite material, such as structural components, or metal components, such as chassis components, this can in particular lead to damaging crack formation in the components of an aircraft engine. Similar damage is also found in other gas turbines, for example in stationary gas turbines. Combustion chamber components are particularly greatly affected by crack formation in gas turbines.

Cracks are local material separations within a structure or within a component. Crack formation is generally a local occurrence in the microstructure of the surface, which is generally caused by lattice defects in the microstructure or by cyclical operational loading. Cracks generally propagate perpendicularly to the normal stress acting thereon. This propagation is referred to as being controlled by normal stress.

For combustion chamber components, cracks form owing to high thermal and mechanical stress. On one hand, crack formation is caused by the high prevailing temperatures, and on the other hand the vibrations transferred to the combustion chamber from the upstream and downstream modules, the high-pressure compressor and the high-pressure turbine encourage crack growth and crack formation.

In addition, temporary thermal material stresses when starting up the gas turbine or during the starting phase of the aircraft facilitate crack formation. Solid particles which are drawn into the gas turbine, such as sand and dust, also contribute greatly to crack formation on combustion chamber components. Furthermore, the on-going thermal stresses during the operating phase of the gas turbine may lead to a change in the geometric shape of the combustion chamber components.

During maintenance of aircraft and/or gas turbine components, in particular during combustion chamber maintenance, the main problem consists in detecting the cracks and changes in geometry which have occurred during operation and repairing the components using suitable measures. Owing to the shapes of the cracks and damage, which are all different, this often proves difficult.

The established repair methods have a process chain which is executed almost completely manually and is characterised by a long and unstable processing time and a low reproducibility of the results of the repair. Both process stability and process quality are highly dependent on the expertise and the years of experience of the person responsible.

The quality of the known repair methods is therefore strongly influenced by the human factor. On the whole, these are also very complex methods, in particular because it must be ensured and documented that the high aviation requirements are met.

Some of the problems are, for example, the inaccuracies which occur when adjusting the components and the complicated and complex patch repairs, in which a damaged region is completely replaced, and this is also associated with high heat input during a weld repair. The high heat input may cause hot crack formation and also results in a high level of finishing complexity owing to the high weld allowance. Furthermore, high heat input leads to distortion, which can only be reduced or corrected by complex clamping devices and also subsequent adjustment processes.

The problem addressed by the invention is therefore that of providing an improved method and a corresponding device for repairing an aircraft and/or gas turbine component.

The invention solves this problem using the features of the independent claims. Further preferred embodiments of the invention are found in the drawings, the dependent claims and the associated description.

In order to solve the problem, according to the invention a method for repairing an aircraft and/or gas turbine component is proposed, wherein the method comprises the automated steps of:
  a) checking the component for cracks using an optical measurement method, wherein gathered geometric and/or damage data are stored in a component-specific manner,
  b) generating an adaptive processing strategy on the basis of the gathered geometric and/or damage data in a data processing unit,
  c) machining the component,
  d) gathering the altered geometric data of the component,
  e) carrying out repair welding,
  f) checking the component for cracks using an optical measurement method.

The method according to the invention can fully automatically adaptively select and/or define a strategy for repairing the component on the basis of detected damage information which is generated during the automatic inspection or check for cracks, and can then automatically carry out said strategy. For this purpose, a database which is linked to the data processing unit contains predefined cases of damage and shapes which are compared with the damage which is currently present in each case. The various cases of damage and/or shapes may in turn each be linked to specific nominal repair programs.

The correct repair measure is then selected. In addition to predefined damage geometries, certain repair logics, the position of the damage on the component, the context of an individual point of damage in a damage cluster, technological information, for example available milling cutter sizes and repair strategies which have been defined in the past, are involved in defining the processing strategy. Preferably, data is continuously transferred between automatic inspection and automatic processing.

The method according to the invention also makes it possible to document, in a component-specific manner over the entire service life of the component, all damage and the repair measures which are carried out. For this purpose, a computer program is preferably provided which automatically stores all the results and component-, repair- and technological information in a database. As a result, damage can be tracked over the service life of the component in order to draw conclusions on the significance or necessity of a repair measure.

Using the method according to the invention, the process times can be reduced and the productivity, reproducibility and process stability and quality can be significantly increased.

For example, the size of the heat-affected zone during welding can be decreased or highly reduced by the automated repair welding, and this has a positive effect on the material properties.

In addition, weld deformations can be reduced owing to the lower heat input. As a result, the otherwise conventional adjustment processes become less complex, or individual processes can be entirely omitted.

In addition, improved surface properties can also be achieved by the automatic machining process. The surface roughness is less chaotic and random in its distribution and size. Owing to the standardised processing, in particular milling, defined surface properties can be achieved, which may have an advantageous effect on a welding operation.

A comparatively homogenous surface structure is also advantageous for the detection capability of the automatic check for cracks. Owing to the automatic process management, the processing region which includes the damage can be locally significantly reduced compared with the manual process. This results in a lower amount of basic material being removed, which is always an objective. In addition, the automatic process management allows a significant reduction in the otherwise conventional weld allowance, thereby also resulting in lower machining costs and a smaller amount of material removal.

Preferably, the component is automatically adjusted before step a) and/or f). The actual geometries are preferably detected using a suitable sensor, for example a laser line scanner, and are used by a computer program for calculating suitable adjustment parameters. Preferably, the component is brought into its target form by a robot unit having a suitable adjustment tool, for example having a lever-like tool. The adjustment parameters and all the data generated by the system, such as numeric control (NC) data, are documented and stored in a suitable manner.

In step a), the geometric and/or damage data are preferably stored in an electronically usable data format, that is to say having an information density and data quality required for automated repair. Preferably, XML files or CAD models having polygon courses of the damage, or a high-resolution point cloud having 3D geometric data of each individual point of damage and/or individual points of damage which have already been pre-filtered and consolidated are used as the data format. The method for checking for cracks, in particular the white light interferometry method which is preferably used for checking for cracks, is described in detail in the patent application DE 10 2011 103 003.8, the content of which has been incorporated into this application in this respect.

The gathered measured data contain information on cracks, burns, geometric deformations and/or other damage. When gathering this geometric data, in the context of automatically checking for cracks, it is advantageous to take into account the different reflective properties of the component surface, external illumination influences, for example by rays of sunlight or hall lighting, and vibrations coupling in, for example caused by forklift trucks or lorries driving past.

In addition, a completely decoupled measurement assembly and optical sensor technology in conjunction with a specific linear unit are preferably used. Preferably, while checking for cracks, current is individually regulated in each individual pixel. The camera chip thus preferably has separate current regulation for each pixel, so that shiny or matte surfaces do not present any problems and so that small cracks are also detected. In addition, rapid sensor movement is preferably provided so that the sensor reacts without being sensitive to the above-mentioned influences. Owing to the rapid sensor movement, which is preferably achieved by a high-speed linear unit, the influences of vibration can be equalised so that decoupling can be omitted in some circumstances.

The component and/or the sensor unit are preferably calibrated prior to the automatic check for cracks, in order to achieve correct adjustment and positioning in space. The component is preferably calibrated via a defined clamping position in the device and in the installation, for example by a zero-point clamping system. The sensor unit, which preferably comprises a high-resolution detection sensor as well as a triangulation sensor for geometry detection and a linear unit, is calibrated on a test body. The calibration is preferably carried out by what is known as tool centre point (TCP) calibration. In addition, a rotational-axis system of an item of handling equipment may be calibrated for the method. For this purpose, a separate measurement program is preferably provided.

The individual-image field size which can be detected by the sensor unit, preferably using the white light interferometry method described above, typically has a range of a few millimeters. Since it is generally not advantageous to analyse the detected individual images, in order to gather the geometric and/or damage data within the context of checking for cracks, the detected individual images are preferably put together by transformation and registration processes to form a full image of the component. The problem of damage extending beyond the edges of an image field and the relationship between the individual image position and the damage position therefore being lost is overcome thereby.

Preferably, in order to analyse the total point cloud of the component, it is broken up into portions which are individually checked for cracks, and structural features and damage being determined and differentiated on the basis of model parameters. In this context, structural features are understood to be, for example, desired recesses or the like.

It is further preferable for damage detected in portions which reaches to the edge of the portion to be marked and to be taken into account for analysing the adjacent portion.

The aim is to identify the position of damage to the entire component. Homogenous transformations first allow the individual images or individual point clouds to be roughly put together. However, in particular if the position of the handling equipment changes, the errors in putting together said images or clouds can quickly become intolerable, since in this case both the positioning error and the calibration error are directly involved. In this context, the point clouds of the individual images are preferably finely registered. In fine registration, the individual images are precisely joined, preferably by means of transformations, for example using what are known as iterative closest point (ICP) algorithms.

However, owing to the size or data volume thereof, the resulting complete image is not always advantageous for damage analysis. By contrast, it is advantageous and preferable to divide the complete image or complete point cloud into suitable individual regions of which the dimensions are greater than the individual images, and which are then examined for damage. Structural features (for example desired recesses) and damage are found therein and are differentiated by comparison with model parameters. Damage which extends to the edge of the region is marked and is taken into account during analysis of the adjacent region.

After the analysis of the individual regions, the detected damage is consolidated in a manner which is advantageous for the subsequent automatic processing and is made available therefor.

On the basis of the geometric and damage data, a computer program fully automatically and adaptively develops a repair strategy in the data processing unit in accordance with certain criteria which preferably include economical and technical optimisations.

The program selects from a plurality of different repairs which either may be specifically tailored to a particular instance of damage or may preferably together cover different individual instances of damage, such as for a patch repair.

In a patch repair, a portion is first milled out of the damaged component. Then either a replacement piece (made of what is known as a donor component) is used or the patch is produced directly in the previously milled region by generative (laser) build-up welding.

Another preferred method is selective laser melting (SLM), in which separating material from donor components can also be omitted. In this method, the material to be processed is melted in powdered form in a powder bed by a laser beam and then solidifies to form a solid material layer. Geometrically complex shapes, such as a patch, can be produced thereby.

In a preferred, standardised repair strategy, adjacent cracks are consolidated to form crack clusters and are processed in one step. For example, standardised milling portions can be produced and can be welded by means of standardised welding programs.

After the processing strategy has been defined, path planning for the sub-processes takes place. This working step is also executed by the central data processing unit. The data processing unit preferably functions as a superordinate unit which produces a master repair program, also known as a "global" repair program. It is thus preferable for the data processing unit to automatically define a repair strategy using the geometric and/or damage data gathered in step a) and predefined technological parameters and to produce a global repair program for the component.

Preferably, milling paths and/or a milling strategy are automatically generated in step b) by the data processing unit. In other words, a milling program is automatically defined and/or selected by the data processing unit, which program contains the code for the milling paths.

The data processing unit preferably comprises a computer program, which determines machine parameters, such as rotational speeds, feed and movement (path planning), using the damage information and the tool parameters. In addition, the data processing unit or the computer program selects the appropriate tools and adapts the nominal processing program to the damage geometries on the basis of the detected actual geometries of the component and stores this as an adaptive processing program.

The adaptive processing program, for example in the form of an NC code, is then executed by a robot unit. In order to increase the accuracy, the working space of the robot unit is preferably restricted, for example a rotary table is provided and the region immediately surrounding the damage is measured. Preferably, another measuring process is not required before and/or after milling and before and/or after welding.

Processing without additional measurement cycles significantly improves the productivity of the system. Stable process parameters, a low degree of component distortion, a precise clamping system and a handling system having a high degree of accuracy in terms of positioning and reproducibility are advantageous in this respect. If processing is not possible without in-process measurement, then there is the option of tactile measurement of the geometry locally in the processing region. Preferably, the measurement is carried out optically by means of a laser line scanner. The gathered measured data may in turn be taken into account by the data processing unit in the adaptive processing program. Furthermore, the accuracy of the handling equipment in terms of positioning and reproducibility is preferably increased by means of a laser tracker.

The appropriate weld paths are preferably calculated by determining the geometry of the volume of material which has been milled off and by adapting the nominal welding programs which are stored in the data processing unit. Preferably, in order to gather the altered geometric data of the component, the geometric and/or damage data gathered in step a) are combined and/or analysed in the data processing unit with the milling paths generated in step b).

The weld paths are thus preferably derived from the adapted milling program and the geometric information for the component. Technological parameters and basic welding strategies which are also stored in the database of the data processing unit also have an influence on the path planning of the welding process. A significant advantage thereof is that measurement of the actual geometry can be omitted. The adapted welding program is thus preferably produced on the basis of the geometric information which is already available from the automatic check for cracks in conjunction with the information from the milling which has previously been carried out and with the nominal welding program.

The automated repair welding is therefore preferably automatically scheduled by the data processing unit on the basis of the altered geometric data of the component. The cracks and/or other damage which have been prepared in this way are then preferably closed by a robot unit using a laser powder build-up welding method.

In a further preferred embodiment, the altered geometric data are gathered by automatically scanning the component and are preferably taken into account in the respective processing programs. In this case, the milling path is optically detected and the geometric information is passed to the next process step, for example to the path planning for the welding process.

Preferably, after the automated repair welding, the need for finishing work is automatically calculated. More preferably, the weld volume geometry is calculated in an intermediate step and the need for finishing work is automatically determined on the basis of the weld volume geometry.

Similarly to the welding program, this can take place automatically on the basis of the available data and nominal programs without the component actually having to be re-measured. Nominal programs are general processing strategies for components as they would be if the component were in a new condition and had the related geometry. Adaptive programs include adaptations to the actual available component, for example certain path parameters for equalising particular geometries, whereas component-independent parameters, such as the cutting speed, remain the same. In the previously-described preferred embodiment, an adapted processing program is automatically produced for finishing milling work.

In another preferred embodiment, the actual weld volume geometry is determined by measuring, for example automatically scanning, the weld seams, and can therefore be taken into account in an adapted finishing program.

Since comparatively little distortion occurs owing to the automated welding, the finishing work can also be reduced or even omitted. Welding without allowance may also be made possible.

The welding process preferably has separate online process monitoring. This is capable of identifying errors or variations in the process on the basis of certain information, for example molten bath temperature and/or molten bath size, and of automatically carrying out regulation. Regulation may be welding a certain position again, for example.

As already stated above, the component is preferably fully automatically adjusted after step e) or before step f). However, the adjustment before step f) may also be omitted in some circumstances, since the heat input zone is significantly reduced by the method according to the invention compared with conventional TIG welding. Less heat, or only highly focused and not extensively applied heat, enters the component, whereby only low or permissible deformations are produced.

Cracks which have developed during the possible second adjustment process or during repair welding are detected in the subsequent second check for cracks and are repaired in the same way if necessary. Preferably, the method steps a) to f) are thus carried out multiple times in succession on the same component.

Once the check for cracks after a repair process does not detect any more damage, the process can be ended. All repair steps are documented in detail in a protocol or a database. This preferably takes place in a component-specific manner, with all information on the component being stored in a component-specific manner, for example with reference to the part number and/or serial number of the component.

Preferably, the sub-processes, such as the check for cracks or inspection, welding preparation, welding and welding finishing work, are in continuous communication with one another. Furthermore, it is preferably provided that the various data and flows of information are compatible, as a result of which the advantageous process automation can be achieved. The various computer programs that are used, for example image processing of the check for cracks, repair strategy, path planning and sequence control, also preferably have communication interfaces, optionally in combination with post-processors for the robot units.

In a manner spanning the sub-processes, all the computer programs are preferably integrated into the master repair program, or "master program" for short. As part of the data processing unit, the master program has a variety of functionalities which allow sequence control that is as simple as possible and allow the operator to intervene in the automatic process if necessary.

The method according to the invention is well suited to those aircraft or gas turbine components which are used as combustion chamber components of an aircraft engine. Combustion chamber components are subjected to high stress and checking for cracks and repair is usually associated with high complexity, which can be significantly reduced by the method according to the invention. In this case, the gas turbine component may for example have a nickel or cobalt base material.

Preferably, the component is a gas turbine component made of a superalloy. Repairing components made of superalloys is generally complex owing to the particular material properties combined with the aviation requirements for repairs. The method according to the invention makes it possible to repair such highly stressed and expensive components in an automated manner.

In order to solve the problem, according to the invention a device is proposed for repairing an aircraft or gas turbine component, wherein the device comprises at least one rotary table for receiving the component, for example an aircraft or gas turbine component, and/or a workpiece carrier, and is set up to carry out the above-described method.

The rotary table may preferably be rotated about its own axis, whereby the component placed thereon can be well processed, for example by a robot unit.

Preferably, the device comprises an automated storage rack, one or more rotary tables and one or more robot units. Different components are stored in the storage rack and are transported via a transport system to the respective processing stations on which the robot units are arranged.

Figure 2:
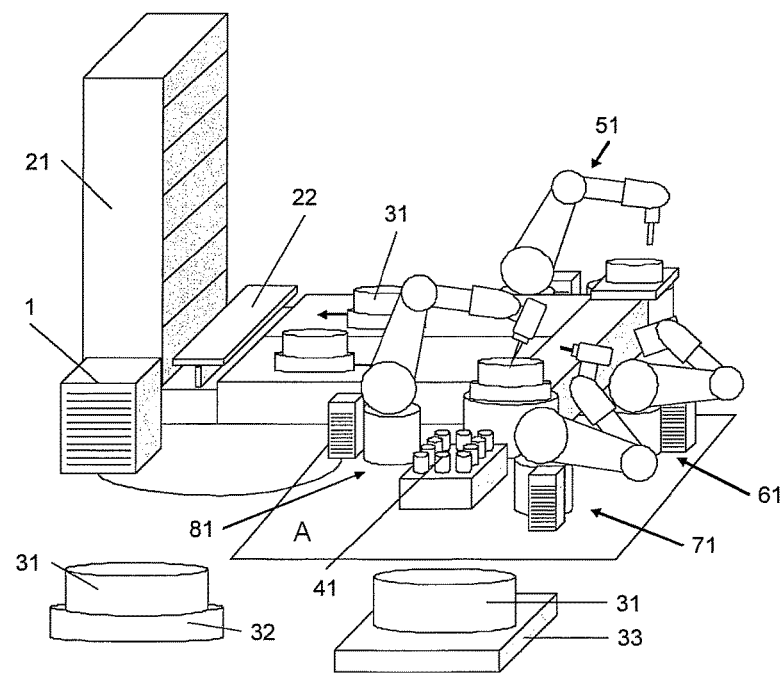

The invention is explained in the following on the basis of preferred embodiments with reference to the accompanying drawings, in which:

FIG. 1 is a view of a device according to the invention comprising a plurality of robot units; and FIG. 2 shows another embodiment of a device according to the invention.

FIG. 1 shows a component 31 which is arranged on a workpiece carrier 32. Preferably, several variants of workpiece carriers 32 are provided for different components 31. One type of workpiece carrier can preferably be used for a group of different component patterns. This embodiment relates to a combustion chamber component made of a superalloy, which is repaired using the device shown.

The device shown comprises a transport system 23, a data processing unit 1 and a plurality of different processing stations; an adjustment station 51, a crack-checking station 61, a milling station 71 and a welding station 81. A tool magazine 41 provides the necessary tools.

The transport system 23, which preferably comprises an automated storage rack 21, a rail system and a lifting station 22, is used for supplying the workpiece and for transfer between the various processing stations. Preferably, both components 31 and workpiece carriers 32 are stored in the storage rack. A component 31 and the workpiece carrier 32 are removed fully automatically depending on the job which is pending for processing. Preferably, the jobs are assigned for processing in a prioritised manner. The prioritisation is predetermined by the planning and control program, which is integrated into the installation as a whole.

The central data processing unit 1 is connected to the various control units 53, 63, 73, 83 which are part of the processing station. An associated robot unit 52, 62, 72, 82 is also arranged on each processing station. A robot unit 52, 62, 72, 82 may be a robot having different kinematics. In advantageous embodiments, articulated robots are used, as shown in FIG. 1. However, CNC processing machines or gantry robots having linear or Cartesian movement axes may also be used, which can achieve a greater degree of accuracy. In addition, one or more robot units 52, 62, 72, 82 having parallel kinematics may also be used.

The component 31 is placed into the storage rack 21 and the required job information is input into the controller via the central data processing unit 1 for the purpose of job prioritisation and selecting the workpiece carrier using a bar code or data matrix code. Before the start of the repair, the adjustment device 33 is brought out and placed onto a lifting station 22 as part of the transport system 23. The adjustment device 33 is a device which has an automatically adjustable adjustment apparatus which corrects global component deformations (for example the component diameter). The component 31 is then brought out onto the adjustment device 33.

The adjustment preferably takes place on a separate carrier in order to allow the greatest possible contact surface, whereby the adjustment forces can be introduced more evenly into the component 31. For the subsequent processing modes, a small contact surface is advantageous and preferred, since this can provide a large processing region.

The component 31 is clamped in a defined position relative to the adjustment device 33 via a preferably mechanical interface between the adjustment device 33 and lifting station 22. Alternatively, the component 31 may be manually mounted on the adjustment device 33 outside the installation and may then be placed into the storage rack 21.

The component together with the adjustment device 33 reaches the adjustment station 51 via the transport system 23. The positioning preferably takes place using a zero-point clamping system. The actual geometry is recorded using an optical sensor.

The sensor may be received by a tool change on the robot unit 52 or may be mounted in a stationary manner beside the adjustment station 51. The central data processing unit 1 determines suitable parameters for the adjustment program based on the actual geometry and sends these to the control unit 53 of the adjustment station 51.

The component 31 is shaped by the robot unit 52 in combination with suitable adjustment tools and the automatically driven adjustment device 32. Adjusting preferably includes correcting local and global deformations. The component 31 is then conveyed back to the lifting station 22 together with the adjustment device 33 by means of the transport system 23. In a changeover process, carried out by the lifting station 22 in combination with the storage rack 21, the adjustment device 33 is placed back onto the rack and the component 31 is clamped on a workpiece carrier 32 for processing.

Alternatively, the changeover process may also be carried out manually outside the installation and may then be placed into the storage rack 21.

The component 31 and the workpiece carrier 32 are then transported to the crack-checking station 61 by means of the transport system 23.

At the crack-checking station 61, the component 31 is preferably fully automatically inspected for damage, for example cracks and burns, and the exact position thereof is passed to the data processing unit 1.

The data processing unit 1 classifies the damage data which has been collected and processed by the crack-checking station 61 into damage categories. A suitable processing strategy is fully automatically selected for each damage category. If, for example, two instances of damage meet predefined criteria which are required for clustering, for example certain positions of damage on the component, the data processing unit 1 fully automatically defines a repair strategy.

For example, two individual instances of damage are consolidated and are repaired together by means of standardised milling and welding. The underlying data processing unit 1 or the underlying computer program is also referred to as an expert system in this case.

The processing programs of the respective sub-processes, which programs have been adapted to the actual geometry, are then produced on the basis of the repair strategy, the damage information and the nominal processing programs. The adapted program modules are put together to form a global repair program, taking into account the clock interval and the cost-effectiveness, and are then sent to the control unit 73 of the milling station 71 and to the control unit 83 of the welding station 81 in the form of a numeric control (NC) code. Before the repair begins, the operator has the option of adapting the global repair program by means of a man-machine interface, also referred to as a human-machine interface (HMI). There is thus preferably the option of inputting data into and/or processing data in the data processing unit 1. In this way, the operator can intervene in the repair if necessary.

The component 31 is fed to the milling station 71 by the transport system 23. A robot unit 72 carries out the milling program which has been adapted from the data processing unit 1 and is intended for welding preparation. For this purpose, the robot unit 72 removes the required tools from the tool magazine 41. The relative movement of the milling tool and the component 31 is thus produced by the robot unit 72 and/or a rotary table.

The milled component 31 is then brought to the welding station 81. The adapted nominal programs are again executed by a robot unit 82. Preferably, a laser powder build-up welding method is used. The welded component 31 is then brought to the milling station 71 (welding finishing work), where the component is machined in order to finish the welded regions. The adapted nominal programs are again executed by a robot unit 72. Preferably, however, the welding finishing work (and thus the transfer to the milling station 71) is not necessary, since the weld allowance is within the tolerances.

In advantageous embodiments, deformations which have developed during the welding process are so small that a second adjustment process can be omitted, or this work can be carried out at the manual work station 92.

In an additional check for cracks, the component 31 is then inspected for newly developed cracks which for example may have developed during a second adjustment and/or during welding. The new cracks which may have developed are processed similarly to the first repair process and are then placed on the transport system 23 and deposited in the storage rack 21.

For certain applications which for example cannot be repaired or can only be repaired in a partially automated manner, additional manual processing or intervention in the automated process is required. For this purpose, a man-machine interface in the form of a manual work station 92 is preferably provided.

The branching 91 is connected between the milling and the welding station 71, 81, so that the mechanic can assist the welding, the welding pre-processing and the welding finishing work using additional manual intervention.

The mechanic preferably processes the component 31 without it having to be previously removed from the tool carrier 32 or the clamping device, and activates the automatic re-entry into the process after their work is complete. Measurement cycles which are required owing to the manual intervention at the work station 92 are preferably automatically planned by the data processing unit 1 and are carried out at the respective processing stations.

FIG. 2 shows a further embodiment in which the milling and welding process and the check for cracks are combined into a single processing station. The adjustment is still carried out at a separate station.

The sequence of the process is identical to the above structure except for the transport steps between the combined stations. Advantages compared with the device shown in FIG. 1 are for example lower purchase costs and lower space requirements in the installation.

A drawback of this variant is, for example, the fact that it is only possible to process jobs sequentially. This embodiment of the invention also has the option of assisting the automatic process sequence with manual interventions at the stations which are provided therefor.

Preferably, the mechanic provides assistance by means of a robot unit, which for example holds a patch in the correct position so that it can be manually welded. The man-machine interface can, in this case, be realized by a monitoring equipment which ensures the safety of the worker. The region A which is accessible to mechanics is shown in FIG. 2.

Furthermore, other embodiments may also be preferable, such as a variant which includes Cartesian processing machines. The robot units would then preferably only be used to supply workpieces.

LIST OF REFERENCE NUMERALS 1 data processing unit
21 storage rack
22 lifting station
23 transport system
31 component
32 workpiece carrier
33 adjustment device
41 tool magazine
51 adjustment station
52 robot unit
53 control unit
61 crack-checking station
62 robot unit
63 control unit
71 milling station
72 robot unit
73 control unit
81 welding station
82 robot unit
83 control unit
91 branching
92 work station

The invention claimed is:

1. A method for repairing an aircraft component or a gas turbine component, comprising:
   (a) checking a component for damage via an optical measurement system, so as to produce damage data, and storing the damage data in a component-specific manner,
   wherein the component is an aircraft component or a gas turbine component;
   (b) generating an adaptive repair strategy based on the damage data,
   wherein generating the adaptive repair strategy comprises processing the damage data via a data processing unit;
   (c) machining the component in accordance with the adaptive repair strategy;
   (d) gathering altered geometric data with respect to the component,
   wherein the altered geometric data with respect to the component is based on how the component was altered by machining the component; and
   (e) carrying out repair welding on the component,
   wherein the damage data comprises a plurality of detected individual images,
   wherein the plurality of detected individual images are put together by transformation and registration processes via the data processing unit to form a full image of the component,
   wherein the full image of the component is broken up into a plurality of image portions,
   wherein each image portion of the plurality of image portions is larger than the detected individual images of the plurality of detected individual images, and
   wherein each image portion of the plurality of image portions is individually checked for damage, and structural features and damage of each image portion of the plurality of image portions is individually determined and differentiated on the basis of model parameters.

2. The method according to claim 1, further comprising:
   (f) after (e), checking the component for damage via the optical measurement system, so as to produce additional damage data, and storing the additional damage data in the component-specific manner.

3. The method according to claim 2, further comprising:
   after (e) and before (f), automatically adjusting the component to bring the component into a target form for the component.

4. The method according to claim 1,
   wherein the adaptive repair strategy comprises milling paths and/or a milling strategy that are automatically generated by the data processing unit.

5. The method according to claim 4,
   wherein the altered geometric data is gathered by processing the damage data and the milling paths and/or milling strategy via the data processing unit.

6. The method according to claim 1, further comprising:
   before (a), automatically adjusting the component to bring the component into a target form for the component.

7. The method according to claim 1,
   wherein checking the component for damage via the optical measurement system comprises:
   checking the component for damage via the optical measurement system using a camera having a plurality of individual pixels,
   wherein while checking the component for damage via the optical measurement system, current is individually regulated in each individual pixel of the plurality of individual pixels.

8. The method according to claim 1,
   wherein when damage detected in a first image portion of the plurality of portions reaches to an edge of the first image portion of the plurality of image portions, the damage detected in the first image portion that reached the edge of the first image portion is marked and is taken into account when analyzing a second image portion of the plurality of image portions that is adjacent to the first image portion.

9. The method according to claim 1,
   wherein generating the adaptive repair strategy comprises processing the damage data and predefined technological parameters, such that the adaptive repair strategy is a global repair program for the component.

10. The method according to claim 1,
    wherein the adaptive repair strategy comprises an automated repair welding, and
    wherein the automated repair welding is automatically scheduled by the data processing unit based on the altered geometric data of the component.

11. The method according claim 1,
    wherein the altered geometric data is gathered by automatically scanning the component via the optical measurement system.

12. The method according to claim 1, further comprising:
    after (e), repeating (a) to (e) at least once with respect to the component.

13. The method according to claim 1,
wherein the component is a gas turbine component made of a superalloy.

14. The method according to claim 1,
wherein the damage data comprises geometric data with respect to the component.

15. The method according to claim 14,
wherein the damage data comprises one or more of the following:
position data with respect to a position of damage on the component;
context data with respect to a context of damage with respect to a damage cluster;
crack data with respect to damage comprising a crack;
shape data with respect to a shape of damage;
burn data with respect to a burn; and
deformation data with respect to a deformation.

16. A method for repairing an aircraft component or a gas turbine component, comprising:
(a) checking a component for damage via an optical measurement system, so as to produce damage data, and storing the damage data in a component-specific manner,
wherein the component is an aircraft component or a gas turbine component;
(b) generating an adaptive repair strategy based on the damage data,
wherein generating the adaptive repair strategy comprises processing the damage data via a data processing unit;
(c) machining the component in accordance with the adaptive repair strategy;
(d) gathering altered geometric data with respect to the component,
wherein the altered geometric data with respect to the component is based on how the component was altered by machining the component; and
(e) carrying out repair welding on the component,
wherein the damage data comprises a plurality of detected individual images,
wherein the plurality of detected individual images are put together by transformation and registration processes via the data processing unit to form a full image of the component, and
wherein when damage detected in a first detected individual image of the plurality of detected individual images reaches to an edge of the first detected individual image of the plurality of detected individual images, the damage detected in the first detected individual image that reached the edge of the first detected individual image is marked and is taken into account when analyzing a second detected individual image of the plurality of detected individual images that is adjacent to the first detected individual image.

17. The method according to claim 16, further comprising:
(f) after (e), checking the component for damage via the optical measurement system, so as to produce additional damage data, and storing the additional damage data in the component-specific manner.

18. The method according to claim 16, further comprising:
wherein the adaptive repair strategy comprises an automated repair welding, and
wherein the automated repair welding is automatically scheduled by the data processing unit based on the altered geometric data of the component.

19. The method according to claim 16,
wherein the altered geometric data is gathered by:
(i) automatically scanning the component via the optical measurement system; or
(ii) processing the damage data and the milling paths and/or milling strategy via the data processing unit.

20. The method according to claim 16,
wherein the damage data comprises one or more of the following:
geometric data with respect to the component;
position data with respect to a position of damage on the component;
context data with respect to a context of damage with respect to a damage cluster;
crack data with respect to damage comprising a crack;
shape data with respect to a shape of damage;
burn data with respect to a burn; and
deformation data with respect to a deformation.

* * * * *